(12) United States Patent
Lynch et al.

(10) Patent No.: US 10,688,522 B2
(45) Date of Patent: Jun. 23, 2020

(54) METHOD OF COATING A LENS AND LENS SUPPORT

(71) Applicant: Transitions Optical, Inc., Pinellas Park, FL (US)

(72) Inventors: Paul J. Lynch, Galway (IE); Gerard P. Mullen, Galway (IE)

(73) Assignee: Transitions Optical, Inc., Pinellas Park, FL (US)

(*) Notice: Subject to any disclaimer, the term of this patent is extended or adjusted under 35 U.S.C. 154(b) by 435 days.

(21) Appl. No.: 15/037,088

(22) PCT Filed: Nov. 17, 2014

(86) PCT No.: PCT/US2014/065935
§ 371 (c)(1),
(2) Date: May 17, 2016

(87) PCT Pub. No.: WO2015/077181
PCT Pub. Date: May 28, 2015

(65) Prior Publication Data
US 2016/0288157 A1  Oct. 6, 2016

Related U.S. Application Data

(60) Provisional application No. 61/906,520, filed on Nov. 20, 2013.

(51) Int. Cl.
*B29D 11/00* (2006.01)
*B05C 13/02* (2006.01)
(Continued)

(52) U.S. Cl.
CPC .............. *B05C 13/02* (2013.01); *B05D 1/005* (2013.01); *B05D 3/0493* (2013.01); *B05D 7/50* (2013.01);
(Continued)

(58) Field of Classification Search
CPC ...... B05C 13/02; B29D 11/00865; G02B 1/11
(Continued)

(56) References Cited

U.S. PATENT DOCUMENTS 4,190,621 A  2/1980 Greshes
4,279,401 A  7/1981 Ramirez et al.
(Continued)

FOREIGN PATENT DOCUMENTS

CN  101356453 A  1/2009
TW  561099 B  11/2003
(Continued)

*Primary Examiner* — Elizabeth A Burkhart
(74) *Attorney, Agent, or Firm* — The Webb Law Firm

(57) ABSTRACT

The present invention relates to a method of coating a lens, such as a segmented multifocal lens. The method includes, providing a lens support (1), which is in the form of a ring, that includes a central axis (11), an outer wall (14), an inner wall (17) that is positioned between the central axis and the outer wall, an upper beveled surface (20) that converges downward toward the central axis, and a lower surface (29). The method further includes positioning a lens (3) such that an outer edge (74) of a forward surface (65) thereof abuts a portion of the upper beveled surface of the lens support. At least one coating composition is applied over the rear surface (68) of the lens, so as to form a coated lens (3') having at least one coating layer (89) over the rear surface thereof.

18 Claims, 7 Drawing Sheets

(51) Int. Cl.
*G02C 7/06* (2006.01)
*G02C 7/10* (2006.01)
*B24B 13/00* (2006.01)
*B05D 1/00* (2006.01)
*B05D 3/04* (2006.01)
*B05D 7/00* (2006.01)

(52) U.S. Cl.
CPC .......... *B24B 13/0012* (2013.01); *B29D 11/00* (2013.01); *B29D 11/00028* (2013.01); *B29D 11/00653* (2013.01); *B29D 11/00865* (2013.01); *G02C 7/06* (2013.01); *G02C 7/102* (2013.01)

(58) Field of Classification Search
USPC .................................................. 427/162–169
See application file for complete search history.

(56) References Cited

U.S. PATENT DOCUMENTS

| | | |
|---|---|---|
| 4,556,605 A | 12/1985 | Mogami et al. |
| 4,731,264 A | 3/1988 | Lin et al. |
| 4,756,973 A | 7/1988 | Sakagami et al. |
| 4,798,745 A | 1/1989 | Martz et al. |
| 4,798,746 A | 1/1989 | Claar et al. |
| 4,836,960 A | 6/1989 | Spector et al. |
| 4,889,413 A | 12/1989 | Ormsby et al. |
| 5,134,191 A | 7/1992 | Takarada et al. |
| 5,231,156 A | 7/1993 | Lin |
| 5,239,012 A | 8/1993 | McEntire et al. |
| 5,433,810 A | 7/1995 | Abrams |
| 5,462,806 A | 10/1995 | Konishi et al. |
| 5,618,586 A | 4/1997 | Swarup et al. |
| 5,645,767 A | 7/1997 | Van Gemert |
| 6,060,001 A | 5/2000 | Welch et al. |
| 6,113,814 A | 9/2000 | Gemert et al. |
| 6,175,450 B1 | 1/2001 | Andreani et al. |
| 6,187,444 B1 | 2/2001 | Bowles, III et al. |
| 6,220,703 B1 | 4/2001 | Evans et al. |
| 6,268,055 B1 | 7/2001 | Walters et al. |
| 6,296,785 B1 | 10/2001 | Nelson et al. |
| 6,432,544 B1 | 8/2002 | Stewart et al. |
| 6,506,488 B1 | 1/2003 | Stewart et al. |
| 6,602,603 B2 | 8/2003 | Welch et al. |
| 7,189,456 B2 | 3/2007 | King |
| 7,256,921 B2 | 8/2007 | Kumar et al. |
| 7,261,843 B2 | 8/2007 | Knox et al. |
| 7,410,691 B2 | 8/2008 | Blackburn et al. |
| 7,452,611 B2 | 11/2008 | Blackburn et al. |
| 7,465,414 B2 | 12/2008 | Knox et al. |
| 7,811,480 B2 | 10/2010 | King |
| 2004/0142105 A1* | 7/2004 | Sakurada ............... G02B 1/105 427/256 |
| 2009/0116126 A1* | 5/2009 | Berzon ............ B29D 11/00028 359/738 |
| 2009/0133625 A1* | 5/2009 | Takahashi ........... B05B 13/0221 118/712 |
| 2011/0049445 A1 | 3/2011 | Chopra et al. |
| 2012/0212840 A1 | 8/2012 | Bowles et al. |

FOREIGN PATENT DOCUMENTS

| | | |
|---|---|---|
| WO | 9420581 A1 | 9/1994 |
| WO | 2015077181 A1 | 5/2015 |

\* cited by examiner

METHOD OF COATING A LENS AND LENS SUPPORT

CROSS REFERENCE TO RELATED APPLICATION

The present application claims priority to U.S. Provisional Patent Application No. 61/906,520, filed on Nov. 20, 2013, the disclosure of which is incorporated herein by reference in its entirety.

FIELD

The present invention relates to a method of coating a lens that includes providing a lens support, positioning the lens on the lens support such that an outer edge of a forward surface of the lens abuts a portion of an upper beveled surface of the lens support, and applying at least one coating composition to the rear surface of the lens.

BACKGROUND

Optical lenses, such as ophthalmic lenses, often have one or more coatings applied thereto for purposes of modifying the properties of the lens, such as tinting properties. For example, coating compositions containing static dyes and/or photochromic dyes or compounds can be applied to a surface of a lens for purposes of modifying the tinting properties of the lens. Static dyes typically have a fixed color and do not change color in response to exposure to actinic radiation, such as sunlight. Photochromic dyes or compounds typically change color, such as reversibly between a bleached (or non-colored) state to a colored state with exposure to actinic radiation. Coatings can be applied to the forward and/or rear surfaces of a lens. In some instances, one or more coatings are applied to the rear surface of a lens for reasons, such as, protecting the coating from damage it may incur on the forward surface of the lens, and/or minimizing defects that may be imparted to the coating when applied to the forward surface thereof.

The forward surface of some lenses includes one or more features that may result in undesirable defects being imparted into a coating applied there-over. Such features include, for example, an incompatible surface tension, which can result in improper wetting of the forward surface by an applied coating composition, or one or more physical structures on the forward surface. For individuals with presbyopia, for example, ophthalmic lenses can be designed and fabricated to include more than one lens power within each lens, and are typically referred to as multifocal lenses. In some instances, the multifocal lens is a segmented multifocal lens in which the forward surface thereof includes at least one segmented optical power addition portion that extends outward relative to the front surface of the lens. Applying a coating to the front surface of such a lens results, in some instances, in the formation of defects due to a lack of uniform coating thickness associated with the optical power addition portion. In the case of a photochromic coating, such a lack of uniform coating thickness can result in the undesirable formation of line defects including, for example, darker lines and/or lighter lines, when the coated optical lens is exposed to actinic radiation. Ophthalmic articles with such coating defects typically do not meet minimal required cosmetic standards.

It would be desirable to develop new methods of coating lenses, such as ophthalmic lenses. It would also be desirable to develop new articles that can provide support for a lens while one or more coatings are applied thereto.

SUMMARY

In accordance with the present invention, there is provided a method of coating a lens that comprises, (a) providing a lens support that comprises: (i) a central axis; (ii) an outer wall; (iii) an inner wall that is positioned between the central axis and the outer wall; (iv) an upper beveled surface that converges downward towards the central axis, the upper beveled surface having an outer diameter and an inner diameter; and (v) a lower surface. The lens support has a form of (or, is in the form of) a ring, and the inner wall defines a central lens support hole of the lens support. The method also comprises, (b) providing a lens having a forward surface, a rear surface, and a side surface, wherein the forward surface of the lens has an outer edge. The method further comprises, (c) positioning the lens support and the lens such that the outer edge of the forward surface of the lens abuts a portion of the upper beveled surface of the lens support. The method further additionally comprises, (d) applying at least one coating composition over the rear surface of the lens, thereby forming at least one coating layer over the rear surface of the lens.

In accordance with the present invention, there is also provided a lens support as described above, in which the upper beveled surface of the lens support has an angle, relative to horizontal, that is selected such that an outer edge of a forward surface of a lens abutting a portion of the upper beveled surface of the lens support is abuttingly retained on the upper beveled surface.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1-7 like characters refer to the same structural features and/or components, as the case may be, unless otherwise stated.

DETAILED DESCRIPTION

Figure 1:
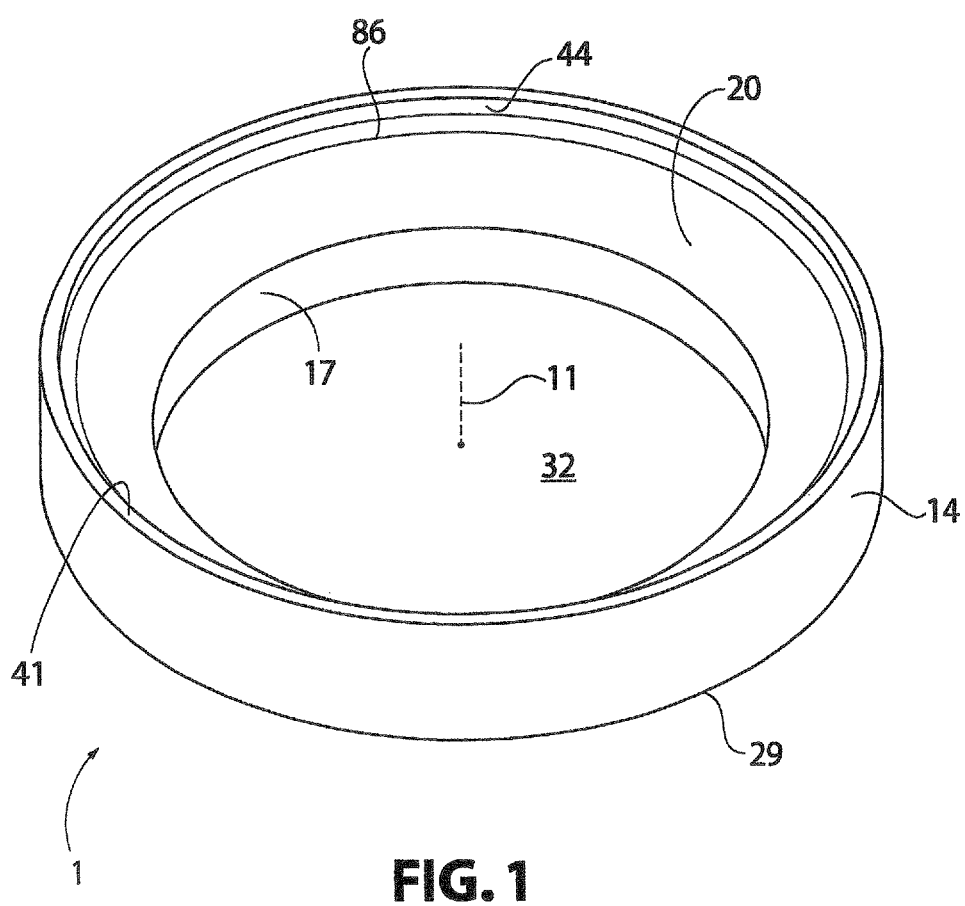
FIG. 1 is a representative perspective view of a lens support according to some embodiments of the present invention.

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, quantities of ingredients, reaction conditions, and so forth used in the specification and claims are to be understood as modified in all instances by the term "about."

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein to modify the term "state," the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds of the present invention can have a different absorption spectrum in each of the first and second state. For example, while not limiting herein, a photochromic compound of the present invention can be clear in the first state and colored in the second state. Alternatively, a photochromic compound of the present invention can have a first color in the first state and a second color in the second state.

As used herein the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

As used herein, the terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

Figure 2:
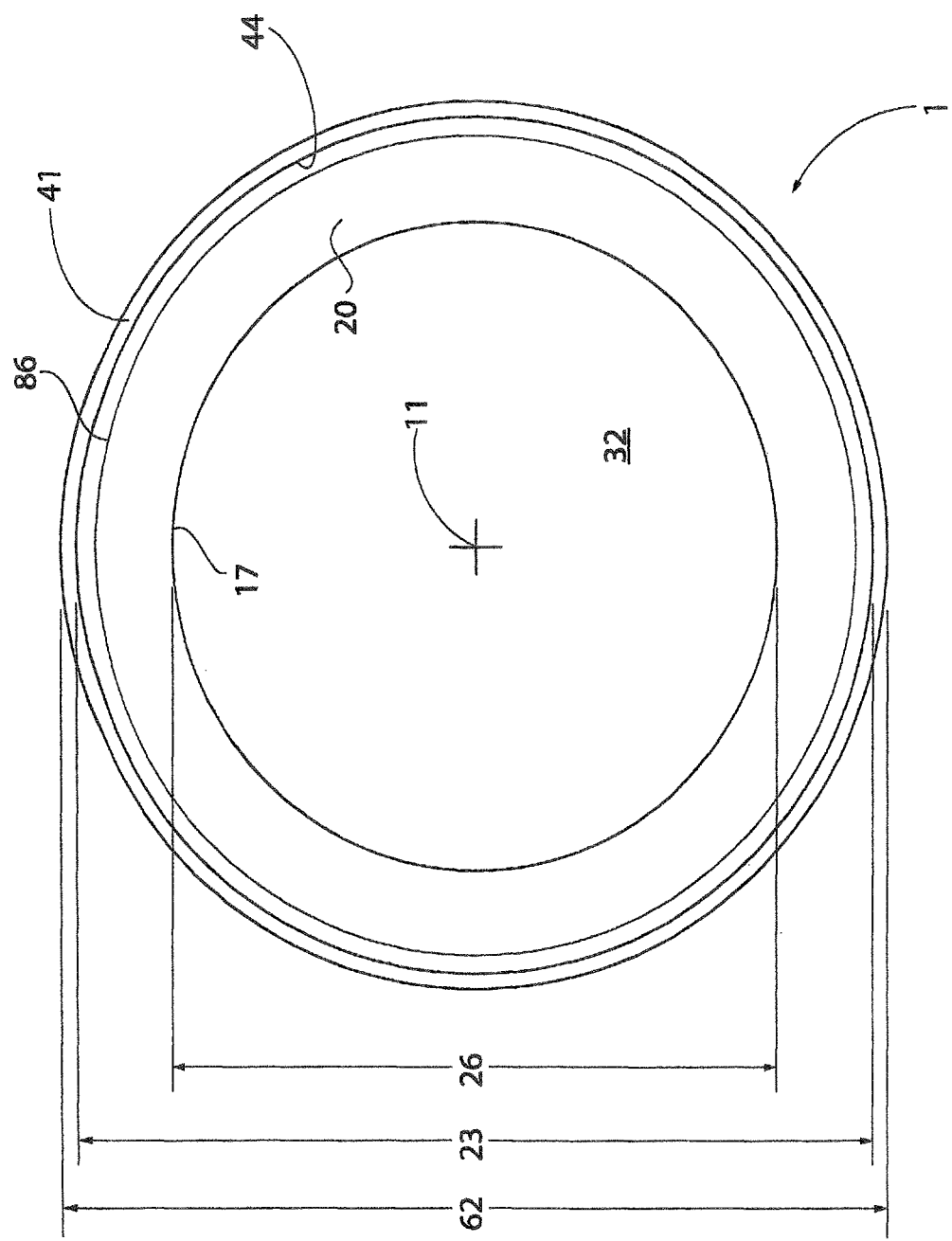
FIG. 2 is a representative top plan view of the lens support of FIG. 1.
Figure 3:
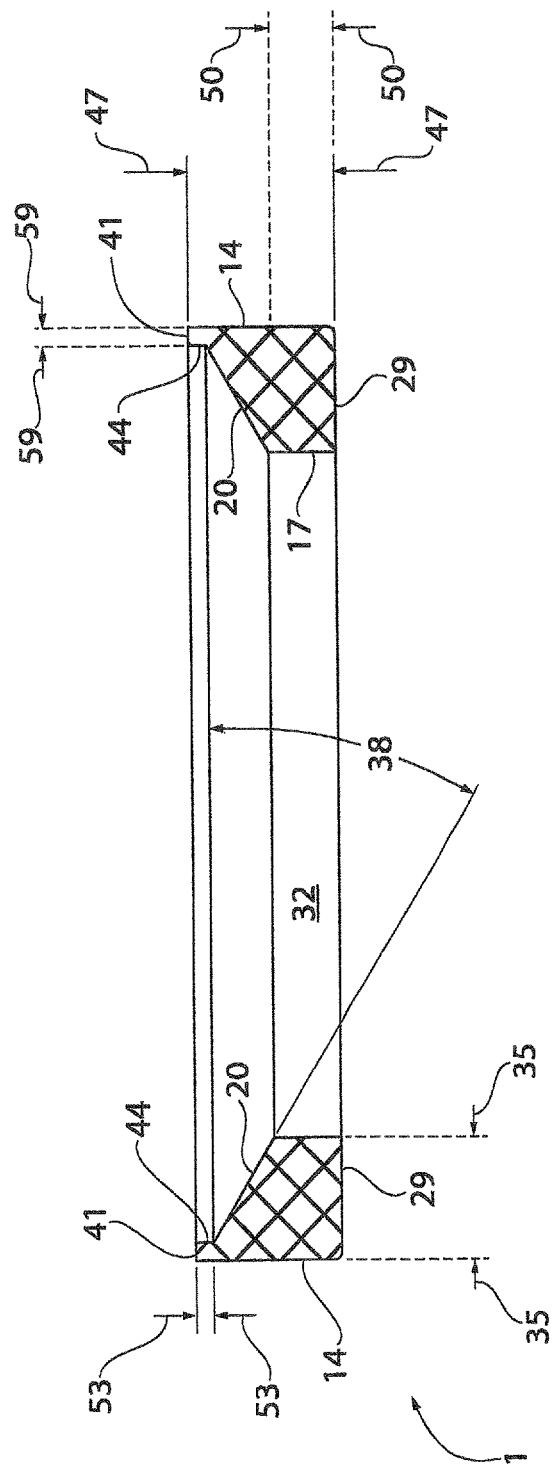
FIG. 3 is a representative sectional view of the lens support of FIG. 1, which includes back-lines.

With reference to FIGS. 1-3 of the drawings, the method of the present invention involves, with some embodiments, providing a lens support 1 that includes a central axis 11, an outer wall 14, and inner wall 17 that is positioned between the central axis 11 and the outer wall 14, and a lower surface 29. Inner wall 17 has a height 50, outer wall 14 has a height 47, and lower surface 29 has a width 35. The lens support 1 also includes an upper beveled surface 20 that converges downward towards the central axis 11. Upper beveled surface 20 has an outer diameter 23, and an inner diameter 26.

The lens support of the present invention is in the form of a ring and the inner wall 17 thereof defines a central lens support hole 32. The lens support of the present invention can have a ring form selected from: polygonal rings (e.g., triangular rings, rectangular rings, square rings, pentagonal rings, hexagonal rings, heptagonal rings, octagonal rings, etc.); circular rings; elliptical rings; irregular rings; and combinations of two or more thereof. With some embodiments, and as depicted in the drawing figures, the lens support of the present invention is in the form of a circular ring (or has a circular ring form).

As discussed above, the upper beveled surface 20 of lens holder 1 has an outer diameter 23, and an inner diameter 26. The difference between outer diameter 23 and inner diameter 26, with some embodiments, is equivalent to the width of the upper beveled surface 20 of the lens holder. With some embodiments, the inner diameter 26 of upper beveled surface 20 is equivalent to the diameter of the central lens support hole 32.

With some embodiments, the diameter (e.g., 26) of the central lens support hole (and correspondingly the inner diameter of the upper beveled surface) is from 35 mm to 70 mm, or from 40 mm to 65 mm, or from 45 mm to 60 mm. With some further embodiments, the outer diameter (e.g., 23) of the upper beveled surface is from 50 mm to 85 mm, or from 55 mm to 80 mm, or from 60 mm to 75 mm. The width of the upper beveled surface (e.g., 20), with some embodiments, is from 5 mm to 30 mm, or from 8 mm to 25 mm, or from 10 mm to 20 mm.

In accordance with some embodiments, the outer wall (e.g., 14) of the lens support has a height (e.g., 47) of from 2 mm to 25 mm, or from 5 mm to 20 mm, or from 10 mm to 15 mm. The inner wall (e.g., 17) of the lens holder has a height (e.g., 50) of from 12 mm to 17 mm, or from 7 mm to 15 mm, or from 5 mm to 10 mm. The lower surface (e.g., 29) of the lens holder, with some embodiments, has a width (e.g., 35, FIG. 3)) of from 1 mm to 20 mm, or from 3 mm to 15 mm, or from 5 mm to 10 mm.

As discussed above, upper beveled surface 20 of lens support 1 converges downward towards the central axis 11. In accordance with some embodiments the upper beveled surface of the lens support has an angle 38 (or downward angle 38), relative to horizontal (or an overlying horizontal), of from 10° to 50°, or from 15° to 45°, or from 20° to 40°.

The lens support can be fabricated from any suitable material or combination of materials. Examples of materials from which the lens support can be fabricated, in accordance with some embodiments, include but are not limited to: wood; ceramics; silicate based glass; metals; crosslinked polymers; thermoplastic polymers; and combinations of two or more such materials. With some embodiments, the lens support is fabricated from and includes a thermoplastic acetal polymer.

The lens support, with some embodiments further includes an annular lip that extends upward from the upper beveled surface of the lens support, and in which the annular lip has an inner lip wall. With reference to FIGS. 1-3, lens support 1 has an annular lip 41 that extends vertically upward from upper beveled surface 20. Annular lip 41 has an inner lip wall 44. With some embodiments, the upper beveled surface 20 extends downward and away from annular lip 41. Annular lip 41 has a height 53, that extends, with some embodiments, above an upper terminus 56 (FIG. 5) of upper beveled surface 20. With some embodiments, the height (e.g., 53) of the annular lip of the lens support is from 0.5 mm to 9 mm, or from 0.75 mm to 7 mm, or from 1 mm to 5 mm. With some further embodiments, the height 47 of outer wall 14 of lens support 1 includes the height 53 of annular lip 41.

The annular lip 41 of the lens support 1 has a width 59. With some embodiments, the width (e.g., 59) of the annular lip is from 0.5 mm to 7 mm, or from 0.75 mm to 5 mm, or from 1 mm to 3 mm.

The annular lip of the lens support, with some embodiments, has an inner diameter, and the inner diameter of the annular lip and the outer diameter of the upper beveled surface of the lens support are substantially equivalent. With reference to FIG. 2, annular lip 41 has an inner diameter 23 that is substantially equivalent to outer diameter 23 of upper beveled surface 20. The inner diameter of the annular lip, with some embodiments, has one or more ranges selected from those as recited previously herein with regard to the outer diameter of the upper beveled surface.

With further reference to FIG. 2, annular lip 41 of lens support 1 has, with some further embodiments, an outer diameter 62. The outer diameter 62 of annular lip 41 is, with some embodiments, from 55 mm to 90 mm, or from 60 mm to 85 mm, or from 65 mm to 80 mm. The width 59 of annular lip 41 is, with some embodiments, equivalent to the difference between the outer diameter 62 and the inner diameter 23 of annular lip 41.

Figure 4:
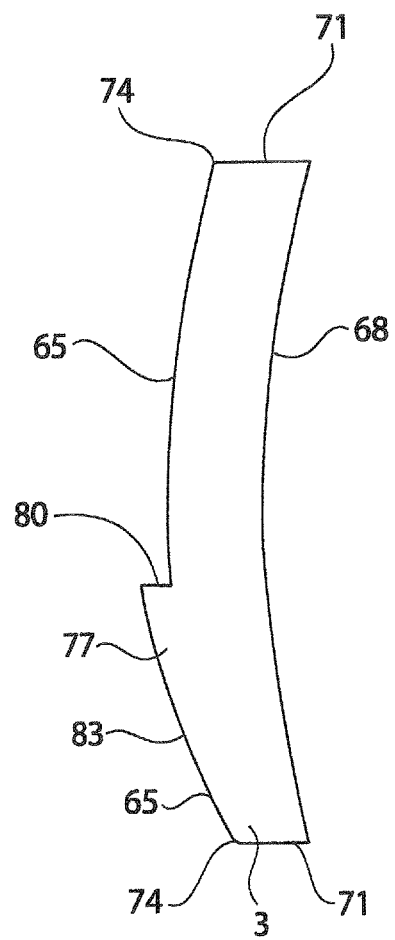
FIG. 4 is a representative sectional view of a lens having a segmented optical power addition portion on the forward surface thereof.

The method of the present invention further includes providing a lens having a forward surface, a rear surface, and a side surface, in which the forward surface of the lens has an outer edge. With reference to FIG. 4, lens 3 has a forward surface 65, a rear surface 68, and a side surface 71. Forward surface 65 of lens 3 has an outer edge 74. The lens that is provided in the method of the present invention, can be in the form of a finished lens or a lens blank, with some embodiments. The lens, with some embodiments, is a non-ophthalmic lens, such as, but not limited to, those used in conjunction with telescopes, binoculars, microscopes, light filters, and light emitting devices. With some further embodiments, the lens is an ophthalmic lens, which can be a corrective lens or a non-corrective lens, such as, but not limited to, sunglasses.

The forward and rear surfaces of the lens can have any suitable shape or define any suitable surface. With some embodiments the forward surface and the rear surface of the lens are each independently (or each independently define) a flat surface, a convex surface, a concave surface, and combinations thereof. The forward surface of the lens, with some embodiments, is a convex surface. The rear surface of the of the lens, with some further embodiments, is a concave surface and/or a flat surface. As depicted in the drawings, such as in FIG. 4, and in accordance with some embodiments, forward surface 65 of lens 3 is a convex surface, and rear surface 68 is a concave surface.

With some embodiments, the forward surface of the lens includes a segmented optical power addition portion. With some further embodiments of the present invention, the forward surface of the lens includes a segmented optical power addition portion, and the lens is a segmented multi-focal lens. With reference to FIG. 4 forward surface 65 of lens 3 includes a segmented optical power addition portion 77.

Segmented optical power addition portion 77 extends outward relative to forward surface 65, with some embodiments. As depicted in FIG. 4, segmented optical power addition portion 77 represents or defines a bifocal portion of lens 3. With some embodiments, the segmented optical power addition portion of the lens can include a plurality of segments, not depicted, and can define, for example, a trifocal portion of the lens.

The lens can have any suitable size and geometric shape. With some embodiments, the lens is substantially circular, having a diameter of from 65 mm to 85 mm, a center thickness of from 5 mm to 20 mm, and an edge thickness of from 1 mm to 20 mm.

With some embodiments, the segmented optical power addition portion includes an upper portion and a lower portion. With further reference to FIG. 4, segmented optical power addition portion 77 has an upper portion 80 and a lower portion 83, which can each independently have any suitable shape. Upper portion 80 is, with some embodiments and as depicted, in the form of a ledge that extends laterally outward from forward surface 65. With some further embodiments, upper portion 80 has an arcuate shape, not depicted, that extends gradually and arcuately outward from forward surface 65. Lower portion 83, with some embodiments, can extend outward from or relative to forward surface 65, and have any suitable shape, such as a ledge (not depicted) or arcuate shape. With some embodiments, lower portion 83 is substantially continuous with the outer edge 74 of the forward surface 65 and/or the side surface 71 of the lens, such as depicted in the drawings.

The lens, with some embodiments, includes a material, such as an optical material, that is selected from an inorganic material, an organic material, and combinations thereof. Examples of inorganic materials from which the lens can be fabricated include, but are not limited to, silicate based glass, such as soda-lime-silicate glass and/or borosilicate glass.

The lens includes, with some embodiments, an organic material (or organic matrix). The organic material (or matrix) of the lens includes, with some embodiments, one or more art-recognized oligomeric and/or polymeric organic materials from which lenses, such as optical lenses, such as ophthalmic lenses, are fabricated. In accordance with some embodiments, the lens includes an organic material that includes, polycarbonate, poly(allyl-carbonate), polyurethane, polythiourethane, poly(urea-urethane), poly(meth)acrylate, polyolefin, polyvinyl, polyester, polyether, poly(siloxane), poly(silane), and combinations thereof. Additional and/or more specific examples of polymers that can be included in the organic matrix of the lens include, but are not limited to: LEXAN thermoplastic polycarbonate; MYLAR polyester; PLEXIGLASS poly(methyl methacrylate); and TRIVEX poly(urea-urethane).

The lens, with some embodiments, is formed from a thermoplastic lens molding composition and/or a crosslinkable lens molding composition. Crosslinkable molding compositions are crosslinked to form a 3-dimensional crosslink network of covalent bonds. Crosslinking of the crosslinkable molding composition can be achieved by art-recognized methods including, but not limited to, exposure to elevated temperature, exposure to actinic light, allowing mixed reactive components to react with each other, and combinations thereof. The various monomers, oligomers, polymers, initiators, and additives used in the lens molding compositions from which the lens is fabricated can be selected from art-recognized materials.

The lens, with some embodiments, can be prepared in accordance with art-recognized molding methods using art-recognized lens molding compositions, such as described in U.S. Pat. Nos. 4,279,401, 4,190,621, and 4,836,960.

Figure 5:
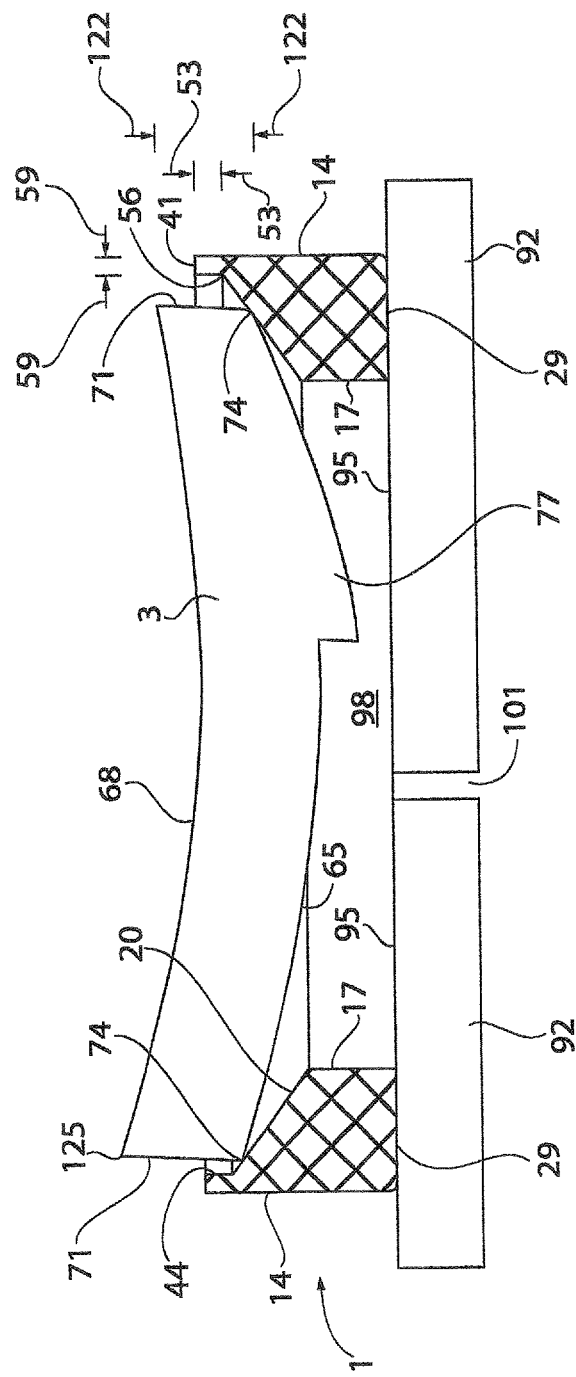
FIG. 5 is a representative sectional view of the lens of FIG. 4 positioned supportively on the lens support of FIG. 1, which resides on a base.

The method of the present invention further includes positioning the lens support and the lens such that the outer edge of the forward surface of the lens abuts a portion of the upper beveled surface of the lens support. With reference to FIG. 5, lens support 1 and lens 3 are positioned relative to each other such that outer edge 74 of forward surface 65 of lens 3 abuts a portion of upper beveled surface 20 of lens support 1.

With some embodiments of the present invention, the outer edge of the forward surface of the lens defines an abutment line on the upper beveled surface of the lens support, and the abutment line is positioned between the inner diameter and the outer diameter of the upper beveled surface. With reference to FIGS. 1, 2 and 5, outer edge 74 of forward surface 65 of lens 3 defines an abutment line 86 (FIGS. 1 and 2) on upper beveled surface 20 of lens support 1. Abutment line 86 is positioned between inner diameter 26 and outer diameter 23 of upper beveled surface 20, with some embodiments.

Figure 7:
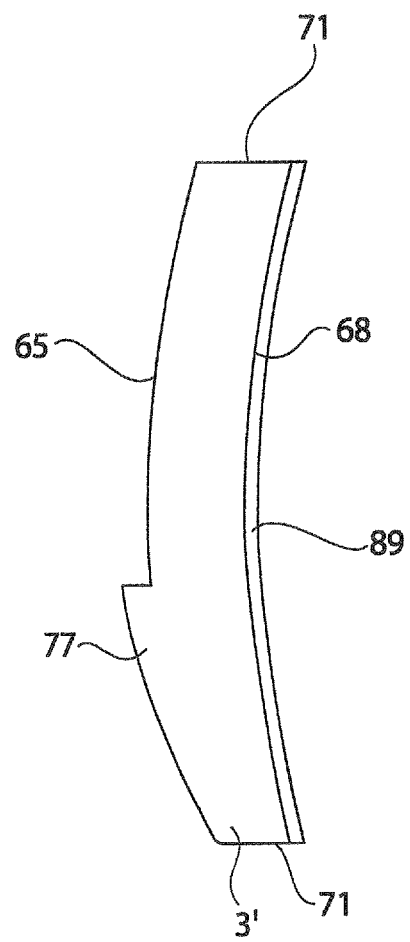
FIG. 7 is a representative sectional view of the lens of FIG. 4, which further includes a coating layer on the rear surface thereof prepared in accordance with some embodiments of the present invention.

The method of the present invention further includes applying at least one coating composition over the rear surface of the lens, thereby forming at least one coating layer over the rear surface of the lens. For purposes of non-limiting illustration and with reference to FIG. 7, coated lens 3' has a coating layer 89 formed over rear surface 68 thereof. With some embodiments, applying each coating composition over the rear surface of the lens independently includes an application method selected from spray application, spin application, curtain application, blade application, and combinations of two or more thereof.

With some embodiments, each coating composition is independently selected from a photochromic coating composition, a primer coating composition, a protective coating composition, and an anti-reflective coating composition.

Each coating layer formed over the rear surface of the lens in the method of the present invention, with some embodiments, can independently have a single layer or multiple layers, each having the same or a different composition.

Each coating composition that is applied over the rear surface of the lens with some embodiments of the method of the present invention, is independently a liquid coating composition or a solid coating composition, such as a particulate coating composition, such as a powder coating composition.

Each coating composition that is applied over the rear surface of the lens with some embodiments of the method of the present invention, independently includes: (i) a resin component; (ii) optionally one or more solvents; and (iii) optionally one or more additives. Examples of solvents include, but are not limited to, the following: propylene glycol monomethyl ether acetate and their derivates (sold as DOWANOL solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof. The solvent can be independently present in the each coating composition, with some embodiments, in an amount of from 1 percent by weight to 95 percent by weight, or from 10 percent by weight to 75 percent by weight, or from 25 percent by weight to 60 percent by weight, in each case based on total weight of the coating composition.

The resin component of each coating composition can independently be a thermoplastic resin component, a curable resin component, or a combination thereof, with some embodiments. The thermoplastic resin component, with some embodiments, includes one or more thermoplastic polymers. Examples of thermoplastic polymers include, but are not limited to, thermoplastic poly(meth)acrylates, thermoplastic polyethers, thermoplastic polythioethers, thermoplastic polyesters, thermoplastic polyamides, thermoplastic polyurethanes, thermoplastic polythiourethanes, thermoplastic polyvinyls, thermoplastic polyolefins and combinations thereof.

When the resin component of the coating composition includes a thermoplastic resin component, converting an applied coating composition to a coating layer includes, with some embodiments, allowing the applied thermoplastic coating composition to solidify. Solidification of the applied thermoplastic coating composition includes, with some embodiments: (i) exposing the applied thermoplastic coating composition to elevated temperature to drive any solvent out of the applied composition; and/or (ii) cooling the applied thermoplastic coating composition to a temperature below the melting point of the thermoplastic resin, such as cooling to room temperature.

With some embodiments, each coating composition independently is a curable coating composition, and converting an applied coating composition to a coating layer includes curing the applied coating composition.

When the resin component of the coating composition is a curable resin component, and correspondingly the coating composition is a curable coating composition, the applied coating composition can be cured by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions.

In accordance with some embodiments, at least one coating composition is a curable coating composition, and the resulting coating layer includes an organic matrix that includes: (i) a polymer chosen from poly(meth)acrylates, polyethers, polythioethers, polyesters, polyamides, polyurethanes, polythiourethanes, polyvinyls, polyolefins, and combinations thereof; and (ii) a plurality of crosslink linkages chosen from ether linkages, sulfide linkages, carboxylic acid ester linkages, carbonate linkages (e.g., —O—C(O)—O—), urethane linkages (e.g., —N(H)—C(O)—O—), thiourethane linkages (e.g., —N(H)—C(O)—S—), siloxane linkages, carbon-carbon linkages, and combinations thereof. With some embodiments, carbon-carbon linkages are formed in the organic matrix of the coating layer by free radical reactions or free radical polymerization, such as in the case of actinic radiation curable coating compositions.

In accordance with some embodiments, at least one curable coating composition includes: a (meth)acrylate copolymer having active hydrogen functionality selected from hydroxyl, thiol, primary amine, secondary amine, and combinations thereof; optionally a polyol that is different than the (meth)acrylate copolymer; a polyisocyanate, such as a diisocyanate and/or a triisocyanate, each optionally blocked with a suitable blocking or leaving group, such as, 3,5-dimethyl pyrazole; optionally one or more solvents, as described previously herein; and optionally one or more additives, including, but not limited to, those additives described further herein, such as, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer of the curable coating composition can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Examples of polyols that can be present in the curable coating compositions include, but are not limited to glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diAdicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, and 4,4'-methylenediphenol. With some further embodiments, the polyols that can be present in the curable photochromic coating composition include, but are not limited to, polyols having number average molecular weights of from 500 to 3500, or from 650 to 2500, or from 650 to 1500, or from 850 to 1200, or from 850 to 1000, such as, but not limited to, polyether polyols and/or polycarbonate polyols. Additional polyols that can be used in the curable coating compositions from which each coating layer is prepared include, but are not limited to, art-recognized materials, such as polyether polyols and polycarbonate polyols, described in U.S. Pat. No. 7,465,414 at column 15, line 22 through column 16, line 62, which disclosure is incorporated herein by reference.

In accordance with some further embodiments, the polyols that can be present in the curable coating compositions include, but are not limited to, one or more high molecular weight polycarbonate polyols, that have carbonate groups (or linkages) within the backbone thereof. With some embodiments, such high molecular weight polycarbonate polyols are high molecular weight polycarbonate diols. With some additional embodiments, the high molecular weight polycarbonate polyols further include one or more linkages in the backbone that are selected from ester linkages, ether linkages, amide linkages, and/or urethane linkages. The high molecular weight polycarbonate polyols, with some embodiments, have Mn values of at least 5000 g/mole, or at least 6000 g/mole, or at least 8000 g/mole. The high molecular weight polycarbonate polyols, with some embodiments, have Mn values of less than or equal to 20,000 g/mole, or less than or equal to 15,000 g/mole, or less than or equal to 10,000 g/mole. In accordance with some further embodiments, the high molecular weight polycarbonate polyols have Mn values ranging between any combination of the above recited upper and lower v, such as from 5000 to 20,000 g/mole, or from 6000 to 15,000 g/mole, or from 8000 to 10,000 g/mole. The polycarbonate polyols, with some embodiments, have PDI values of less than or equal to 2.0, or less than or equal to 1.5, or less than or equal to 1.3.

The high molecular weight polycarbonate polyols are, with some embodiments, prepared by art-recognized isolation methods that involve isolating a high molecular weight fraction of polycarbonate polyols from a feed polycarbonate polyol that is composed of a mixture of low and high molecular weight polycarbonate polyols. With some embodiments, the high molecular weight polycarbonate polyols are obtained by successively washing a feed polycarbonate polyol with a suitable solvent, such as methanol, with removal of a low molecular weight fraction between each successive washing, until a product polycarbonate polyol is obtained that has a desirably high (or increased) molecular weight, such as an Mn value of at least 5000 g/mole, and a desirably low (or reduced) PDI value, such as less than or equal to 1.5. With some embodiments, the high molecular weight polycarbonate polyols are isolated from feed aliphatic polycarbonate polyols. Examples of commercially available feed aliphatic polycarbonate polyols, from which the high molecular weight polycarbonate polyols are isolated, with some embodiments, include but are not limited to: PC-1122 polycarbonate polyol, which is commercially available from Stahl USA; ETERACOLL™ PH-200D, PH-200 and UH-200 polycarbonate polyols, which are commercially available from Ube Chemical; DURANOL™ T5652 polycarbonate polyol, which is commercially available from Asahi-KASEI; and/or RAVECARB™ 107 polycarbonate polyol, which is commercially available from Enichem.

High molecular weight polycarbonate polyols that can be present in the curable coating compositions include, but are not limited to, those described in further detail in paragraphs [0041]-[0047] and [0102]-[0114] of United States Patent Application Publication No. US 2012/0212840 A1, the cited disclosure of which is incorporated herein by reference.

Polyfunctional isocyanates (or polyisocyanates) that can be present in the curable coating compositions from which one or more coating layers can be prepared include, but are not limited to, aliphatic, aromatic, cycloaliphatic and heterocyclic polyisocyanates, and mixtures of such polyisocyanates. Examples of polyisocyanates that can be present in the photochromic coating composition include, but are not limited to: toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; dimers and trimers of such diisocyanates containing isocyanurate, uretidino, biruet, or allophanate linkages (such as a trimer of isophorone diisocyanate); and mixtures and/or combinations of two or more thereof. Further examples of polyisocyanates that can be present in the photochromic coating composition include, but are not limited to those described in U.S. Pat. No. 7,465,414 at column 16, line 63 through column 17, line 38, which disclosure is incorporated herein by reference.

Catalysts that catalyze the formation of urethane linkages that can be used in the coating compositions from which each coating layer is independently prepared include, but are not limited to, art-recognized materials, such as one or more stannous salts of an organic acid, examples of which include, but are not limited to, stannous octoate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Additional classes of catalysts include, but are not limited to, bismuth salts of organic acids, such as bismuth 2-ethylhexanoate, and zinc-based catalysts. The catalyst is present in the coating compositions, with some embodiments, in an amount that is at least sufficient to catalyze the formation of urethane linkages under the particular cure conditions that are employed. With some embodiments, the catalyst is a stannous salt of an organic acid, which is present in an amount of from 0.0005-0.02 parts per 100 parts of the polyurethane-forming components. Further non-limiting examples of components, such as polyols, polyisocyanates, and catalysts, that can, with some embodiments, be used with polyurethane coating compositions from which the coating compositions of the method of the present invention can be selected, are described in U.S. Pat. Nos. 4,889,413 and 6,187,444 B1.

With some embodiments, at least one coating layer is formed from a coating composition that includes one or more radically polymerizable monomers. Classes and examples of radically polymerizable monomers that can be included in the coating compositions, with some embodiments, include, but are not limited to: $C_1$-$C_{20}$ linear, branched, or cyclic alkyl (meth)acrylate monomers; allylic monomers; bis(allyl carbonate) monomers, such as polyol (allyl carbonate) monomers, such as polyalkylene glycol bis(allyl carbonate) monomers, dithylene glycol bis(allyl carbonate) monomer, bisphenol A bis(allyl carbonate) monomer, and alkoxylated bisphenol A bis(allyl carbonate) monomers; polyfunctional (meth)acrylate monomers, such as alkylene glycol bis(meth)acrylate monomers, polyalkylene glycol bis(meth)acrylate monomers, trimethylolpropane tris(meth)acrylate monomer, alkoxylated trimethylolpropane tris(meth)acrylate monomers, polyalkoxylated trimethylolpropane tris(meth)acrylate monomers, pentaerythritol tris(meth)acrylate, pentaerythritol tetrakis(meth) acrylate, alkoxylated pentaerythritol tris(meth)acrylate, alkoxylated pentaerythritol tetrakis(meth)acrylate, polyalkoxylated pentaerythritol tris(meth)acrylate, polyalkoxylated pentaerythritol tetrakis(meth)acrylate, dipentaerythritol hexakis(meth)acrylate, alkoxylated, dipentaerythritol hexakis(meth)acrylate, and polyalkoxylated dipentaerythritol hexakis(meth)acrylate; vinyl aromatic monomers, such as styrene, alpha-methylstyrene, p-chloromethylstyrene, divinyl benzene, vinyl naphthalene and divinyl naphthalene; vinyl esters of carboxylic acids such as, vinyl acetate, vinyl butyrate, vinyl 3,4-dimethoxybenzoate, and vinyl benzoate; olefin monomers, such as propylene, 1-butene, 1,3-butadiene, isobutylene and diisobutylene; and other ethylenically unsaturated radically polymerizable monomers, such as cyclic anhydrides (such as maleic anhydride, 1-cyclopentene-1,2-dicarboxylic anhydride and itaconic anhydride), esters of acids that are unsaturated but do not have alpha, beta-ethylenic unsaturation, (such as methyl ester of undecylenic acid), and diesters of ethylenically unsaturated dibasic acids (such as diethyl maleate). Examples of allylic monomers include, but are not limited to: (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate. Examples of $C_1$-$C_{20}$ linear, branched, or cyclic alkyl (meth)acrylate monomers that can be present in the radically polymerizable coating composition include, but are not limited to, methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate.

Coating compositions that include one or more radically polymerizable monomers can further include, with some embodiments, one or more solvents as described previously herein, one or more additives as described further herein, and one or more initiators as described further herein.

Non-limiting examples of photoinitiators that can be present in the coating compositions, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in the coating compositions, is a visible light photoinitiator. Examples of suitable visible light photoinitiators include but are not limited to, benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H—Nu series of initiators available from Spectra Group Limited, 2-hydroxy-2-methyl-1-phenylpropan-1-one, 1-hydroxycyclohexyl phenyl ketone, 2-isopropylthixantone, alpha-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylepentylphosphine oxide, bis(2,6-dimethylbenzoyl)-2,4,4-trimethylpentylphosphine oxide, bis (2,4,6-trimethylbenzoyl)-2,4,4-trimethylpentylphosphine oxide, and bis(2,6-dichlorobenzoyl)-2,4,4-trimethylpentylphosphine oxide, phenyl-4-octyloxyphenyliodonium hexafluoroantimonate, dodecyldiphenyliodonium hexafluoroantimonate, (4-(2-tetradecanol)oxyphenyl)iodonium hexafluoroantimonate and mixtures thereof. Further examples of photoinitiators are set forth at column 12, line 11 to column 13, line 21 of U.S. Pat. No. 6,602,603, which is specifically incorporated by reference herein.

Examples of thermal initiators include, but are not limited to, organic peroxy compounds and azobis(organonitrile) compounds. Examples of organic peroxy compounds that are useful as thermal initiators include, but are not limited to, peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and di isopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate. Examples of azobis(organonitrile) compounds that can be used as thermal initiators include, but are not limited to, azobis(isobutyronitrile), azobis(2,4-dimethylvaleronitrile) or a mixture thereof.

Examples of polymerization inhibitors include, but are not limited to: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

The coating compositions used in the method of the present invention can further include at least one additive that, with some embodiments, is capable of facilitating one or more of the processing, the properties, or the performance of the coating composition and resulting coating layer. Non-limiting examples of such additives include static dyes, photoinitiators, thermal initiators, polymerization inhibitors, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

Examples of static dyes (i.e., tints or dyes that are not photochromic) that can be present in a coating composition and the resulting coating layer include, but are not limited to, art-recognized static organic dyes that are capable of imparting a desired color or other optical property to the coating layer. Examples of static dyes that can be present in a coating composition and a resulting coating layer include, but are not limited to, azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures and/or combinations thereof. Examples of anthraquinone dyes from which the fixed dye can be selected, with some embodiments, include but are not limited to, 1,4-dihydroxy-9,10-antracenedione (CAS registry No. 81-64-1), 1,4-bis(4-methylphenyl)amino-9,10-anthracendione (CAS registry No. 128-80-3), 1,4-bis((2-bromo-4,6-dimethylphenyl) amino)-9,10-anthracenedione (CAS registry No. 18038-98-8), and mixtures thereof.

Additional additives that can be present in the coating compositions include hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

Further additives that can be present in the coating compositions include other adhesion enhancing ingredients. For example, although not limiting herein, the coating compositions can further include an adhesion-enhancing amount of an epoxy-containing material. Adhesion-enhancing amounts of an epoxy-containing materials when included in the coating compositions, can improve the adhesion of a subsequently applied coating or layer thereto. A class of an epoxy (or oxirane) functional adhesion promoters that can be included in photochromic coating composition include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

In accordance with some embodiments, at least one coating composition includes an aminoplast crosslinker (such as, but not limited to, a melamine crosslinker) and one or more reactive components having functional groups that are reactive with the aminoplast crosslinker, such as, but not limited to, hydroxyl, carbamate, and/or urea, and is referred to as an aminoplast based photochromic coating composition. Non-limiting examples of aminoplast based coating compositions from which the coating compositions of the present method can be selected include, but are not limited to, those described in, for example, U.S. Pat. Nos. 6,432,544 B1 and 6,506,488.

With some embodiments, at least one coating composition is a polysilane (or polysiloxane) coating composition that includes hydrolysable silane monomers, such as, but not limited to, tetraalkoxy silane (such as tetraethoxy silane and/or tetramethoxy silane), and/or alkyl alkoxy silanes in which the alkyl group optionally includes a functional group, such as oxirane, vinyl, amine, and/or (meth)acryloyl. Non-limiting examples of polysilane based coating compositions from which the coating compositions of the present method can be selected include, but are not limited to, those described in, for example, U.S. Pat. No. 4,556,605.

In accordance with some further embodiments, at least one coating composition includes one or more components (such as, but not limited to oligomers and/or polymers) having two or more carboxylic acid anhydride groups and one or more reactive components each independently having two or more groups that are reactive with carboxylic acid anhydride groups, such as hydroxyls, which can be referred to as carboxylic acid anhydride based coating compositions. Non-limiting examples of carboxylic acid anhydride based coating compositions from which the coating compositions of the present method can be selected include, but are not limited to, those described in, for example, U.S. Pat. Nos. 4,798,745, 4,798,746, and 5,239,012.

With some additional embodiments, at least one coating composition includes one or more components (such as, but not limited to oligomers and/or polymers) that include residues of alkoxyacrylamide monomers, such as but not limited to N-alkoxymethyl(meth)acrylamide monomers, which can be referred to as alkoxyacrylamide based coating compositions. Non-limiting examples of alkoxyacrylamide based coating compositions from which the coating compositions of the present method can be selected include, but are not limited to, those described in, for example, U.S. Pat. Nos. 6,060,001 and 5,618,586.

With some further additional embodiments, at least one coating composition includes one or more components (such as, but not limited to oligomers and/or polymers) having two or more oxirane groups, and one or more reactive components each independently having two or more groups that are reactive with oxirane groups, such as hydroxyls, thiols, carboxylic acids, and amines, which can be referred to as oxirane (or epoxy) based coating compositions. Non-limiting examples of oxirane based coating compositions from which the coating compositions of the present method can be selected include, but are not limited to, those described in, for example, U.S. Pat. Nos. 4,756,973 and 6,268,055 B1.

With some embodiments of the present invention, at least one coating composition that is applied to the rear surface of the lens is a photochromic coating composition. Each photochromic coating composition can, with some embodiments, be selected from one or more of the classes and examples of coating compositions described previously herein, which further include one or more photochromic compounds.

With some embodiments the photochromic compound of the photochromic coating composition is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

Further examples of photochromic compounds, that can be present in the photochromic coating compositions of the method of the present invention, can, with some embodiments, be selected from certain indeno-fused napthopyran compounds, such as described in U.S. Pat. No. 6,296,785, at column 3, lines 66 through column 10, line 51, which disclosure is incorporated herein by reference.

With some embodiments, the photochromic compound, that can be present in the photochromic coating compositions of the method of the present invention, can be selected from one or more indeno-fused naphthopyran compounds having a pi-conjugation extending group, such as a halogen or halogen substituted group, bonded to the 11-position of the indeno-fused naphthopyran. Examples of indeno-fused naphthopyran compounds having a pi-conjugation extending bonded to the 11-position thereof include, but are not limited to, those disclosed in United States Patent Application Publication No. US 2011/0049445 A1 at paragraphs [0030] through [0080], which disclosure is incorporated herein by reference.

The photochromic compounds, with some embodiments, that can be present in the photochromic coating compositions of the present invention, can be covalently bonded to the matrix in which they reside, such as the organic matrix, of the resulting photochromic coating layer. With some embodiments, the photochromic compounds can include one or more reactive groups, such as one or more polymerizable groups. With some embodiments, the photochromic compounds can be selected from 2H-naphtho[1,2-b]pyrans, 3H-naphtho[2,1-b]pyrans and/or indeno[2,1-f]naphtho[1,2-b]pyrans each having at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group. Examples of such photochromic compounds include, but are not limited to, those disclosed in U.S. Pat. No. 6,113,814, at column 2, line 52 through column 8, line 40, which disclosure is incorporated herein by reference.

The photochromic compounds that can be included in the photochromic coating compositions of the method of the present invention include, or can be, with some embodiments, photochromic-dichroic materials and compounds. The photochromic-dichroic materials and compounds can, with some embodiments, be selected from art-recognized photochromic-dichroic materials and compounds. Photochromic-dichroic compounds typically have a photochromic group (P) and at least one lengthening agent or group (L) covalently bonded to the photochromic group. The photochromic groups of the photochromic-dichroic compounds can be selected from those classes and examples as described previously herein with regard to the photochromic compounds, such as, but not limited to, pyrans, oxazines, fulgides, and indeno-fused naphthopyrans. Examples of photochromic-dichroic compounds that can be included in the coating compositions of the method of the present invention, include, but are not limited to those disclosed in U.S. Pat. No. 7,256,921 B2 at column 19, line 3 through column 22, line 46, which disclosure is incorporated herein by reference. Examples of lengthening groups (L) and photochromic groups (P) include, but are not limited to those disclosed in U.S. Pat. No. 7,256,921 B2 at column 22, line 47 through column 35, line 27, which disclosure is incorporated herein by reference.

The photochromic compounds and/or photochromic-dichroic compounds can be present in the photochromic coating composition, in amounts (or ratios) such that the resulting photochromic coating layer (and the coated lens) exhibits desired optical properties. For purposes of non-limiting illustration, the amount and types of photochromic compounds and/or photochromic-dichroic compounds can be selected such that the photochromic coating layer is clear or colorless when the photochromic compounds and/or photochromic-dichroic compounds are in the closed-form (e.g., in the bleached or unactivated state), and can exhibit a desired resultant color when the photochromic compounds and/or photochromic-dichroic compounds are in the openform (e.g., when activated by actinic radiation). The precise amount of the photochromic compounds and/or photochromic-dichroic compounds that are utilized is not critical, provided that at least a sufficient amount is used to produce the desired effect. The particular amount of the photochromic compounds and/or photochromic-dichroic compounds used can depend on a variety of factors, such as but not limited to, the absorption characteristics of the photochromic compounds and/or photochromic-dichroic compounds, and the color and intensity of the color desired upon activation. In accordance with some embodiments of the method of the present invention, the amount of the photochromic compound(s) and/or photochromic-dichroic compound(s) that are present in the photochromic coating layer formed on the lens can range from 0.01 to 40 weight percent, or from 0.05 to 15, or from 0.1 to 5 weight percent, based on the weight of the photochromic coating layer.

With some embodiments, two or more photochromic compounds are used in combination with each other and/or with one or more photochromic-dichroic compounds, so as to complement one another and to produce a desired color or hue. For example, mixtures of photochromic compounds can be used with some embodiments to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

The photochromic coating layer can have any suitable thickness, provided it provides a desirable level of photochromic properties, such as but not limited to a desirable range of optical density values. With some embodiments, each photochromic coating layer independently has a thickness of from 0.5 to 50 microns, such as from 1 to 45 microns, or from 2 to 40 microns, or from 5 to 30 microns, or from 10 to 25 microns.

In accordance with some embodiments, when a photochromic coating layer is formed on the rear surface of the lens, at least one further coating layer (that is not photochromic) is optionally interposed between the rear surface of the lens, and the photochromic coating layer. With some further embodiments, at least one primer coating layer and/or at least one protective coating layer is optionally formed and interposed between the rear surface of the lens, and the photochromic coating layer. With some additional embodiments, (i) the organic matrix of the lens includes polycarbonate, and (ii) at least one primer coating layer and/or at least one protective coating layer is formed and interposed between the rear surface of the lens, and the photochromic coating layer.

With some embodiments, the coating composition that is applied with the method of the present invention is selected from a primer coating composition, which results in the formation of a primer coating layer over the rear surface of the lens. The primer coating composition is selected, with some embodiments, from one or more of those classes and examples of coating compositions described previously herein, which result in the formation of a coating layer that includes an organic matrix, such as a thermoplastic organic matrix and/or a crosslinked organic matrix. Additionally or alternatively to forming an organic matrix, the primer coating composition is selected, with some embodiments, so as to result in the formation of a primer layer that includes an inorganic matrix, including, for example, silane linkages, siloxane linkages and/or titanate linkages. With some embodiments, the organic matrix of the primer coating layer includes, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); carbon-carbon linkages; and/or thiourethane linkages (e.g., —N(H)—C(O)—S—).

Typically, each primer coating layer is formed from a primer coating composition. The primer coating composition can be a curable primer coating composition, that is curable by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions, as described previously herein.

Each primer coating layer can independently have any suitable thickness. With some embodiments, each primer coating layer independently has a thickness of from 0.5 microns to 20 microns, such as from 1 to 10 microns, or from 2 to 8 microns, or from 3 to 5 microns, inclusive of the recited values.

With some embodiments, the coating composition that is applied with the method of the present invention is selected from a protective coating composition, which results in the formation of a protective coating layer over the rear surface of the lens. The protective coating composition is, with some embodiments, selected from an abrasion-resistant coating composition, such as a "hard coat" coating composition. Each resulting protective coating layer can include a single layer or multiple layers, each having the same or a different composition. Each protective coating composition can each be independently selected from: abrasion-resistant coating compositions that include organo silanes; abrasion-resistant coating compositions that include radiation-cured acrylate-based monomers and/or oligomers; abrasion-resistant coating compositions that include inorganic materials such as silica, titania and/or zirconia; organic abrasion-resistant coating compositions of the type that are ultraviolet light curable; oxygen barrier-coating compositions; and UV-shielding coating compositions. With some embodiments, the protective coating compositions are selected so as to result in the formation of a hard coat layer that includes a first coating layer of a radiation-cured acrylate-based thin film and a second coating layer including an organo-silane. Non-limiting examples of commercially available hard coating products include SILVUE® 124 coatings, commercially available from SDC Coatings, Inc., and HI-GARD® coatings, commercially available from PPG Industries, Inc.

The protective coating composition can be selected from art-recognized hard coat composition, such as organo-silane abrasion-resistant coating compositions. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard coatings, which disclosures are also incorporated herein by reference. The hard coat composition(s) can be applied by those coating methods as described previously herein, such as spin coating.

Other coating compositions that can be used to form the protective coating layer, include, but are not limited to, polyfunctional acrylic hard coatings, melamine-based hard coatings, urethane-based hard coatings, alkyd-based coatings, silica sol-based hard coatings or other organic or inorganic/organic hybrid hard coatings.

The protective coating layer, with some embodiments, is formed from from art-recognized organo-silane type hard coating compositions. Organo-silane type hard coatings from which the optional protective coating layer can be formed include, but are not limited to, those disclosed at column 24, line 46 through column 28, line 11 of U.S. Pat. No. 7,465,414 B2, which disclosure is incorporated herein by reference.

Further examples of coating compositions from which the protective coating layer can be prepared, with some embodiments, include but are not limited to: (meth)acrylate based protective coating compositions, such as described in U.S. Pat. No. 7,410,691; radiation curable acrylate based protective coating compositions, such as described in U.S. Pat. No. 7,452,611 B2; thermally cured protective coating compositions, such as described in U.S. Pat. No. 7,261,843; maleimide based protective coating compositions, such as described in U.S. Pat. No. 7,811,480; and dendritic polyester (meth) acrylate based protective coating compositions, such as described in U.S. Pat. No. 7,189,456.

With some embodiments, the coating composition that is applied with the method of the present invention is selected from an anti-reflective coating composition, which results in the formation of an anti-reflective coating layer, which typically includes at least two layers each having a different refractive index, over the rear surface of the lens. With some embodiments, the anti-reflective coating compositions are selected so as to result in the formation of an anti-reflective coating layer that includes a first layer having a refractive index of from 1.6 to 2.5, or from 1.95 to 2.4, and a second layer having a refractive index of from 1.30 to 1.48, or from 1.38 to 1.48. The resulting anti-reflective coating layer includes, with some embodiments, a plurality of such alternating first and second layers. With some embodiments, the first layer of the anti-reflective coating layer includes at least one of, $TiO_2$, $Ti_2O_3$, $Ti_3O_5$, $Pr_6O_{11}+xTiO_2$, $CeO_2$, $HfO_2$, $Ta_2O_5$, $ZrO_2$, and $SnO_2$. With some embodiments, the second layer of the anti-reflective coating layer includes at least one of, $SiO_2$, $MgF_2$, $AlF_3$, $BaF_2$, $Na_5Al_3F_{14}$, $Na_3AlF_6$, and $YF_3$. Examples of anti-reflective coating compositions from which the anti-reflective coating layer can be selected are described in U.S. Pat. No. 6,175,450 B1 at column 1, line 56 through column 2, line 7; column 2, lines 50-65; and column 5, lines 22-58, which disclosure is incorporated herein by reference.

With some embodiments of the method of the present invention, the lower surface of the lens support resides on a base, the forward surface of the lens, the inner sidewall of the lens support, and an upper surface of the base together define a central lens support chamber. With the lens, lens support, and base so configured, the method of the present invention further includes, with some embodiments, forming negative pressure within the central lens support chamber, thereby maintaining the outer edge of the forward surface of the lens and the upper beveled surface of the lens support in fixed abutment with each other during application of at least one coating composition over the rear surface of the lens.

With reference to FIG. 5, lower surface 29 of lens support 1 resides on a base 92, such as an upper surface 95 of base 92. Forward surface 65 of lens 3, inner sidewall 17 of lens support 1, and an upper surface 95 of base 92 together define a central lens support chamber 98. With lens 11, lens support 1, and base 92 so configured, the method of the present invention further includes, with some embodiments, forming negative pressure within central lens support chamber 98, thereby maintaining outer edge 74 of forward surface 65 of lens 3 and upper beveled surface 20 of lens support 1 in fixed abutment with each other during application of at least one coating composition over rear surface 68 of lens 3.

Negative pressure can be formed within central lens support chamber 98 in accordance with art-recognized methods. With some embodiments, negative pressure is formed within central lens support chamber 98 by drawing at least a portion of the resident gas, such as air, out of central lens support chamber 98 through one or more passages in base 92, such as passage 101. The formation of negative pressure within central lens support chamber 98 results in, with some embodiments, forward surface 65 of lens 3 being drawn down towards upper surface 95 of base 92, which results in outer edge 74 of forward surface 65 of lens 3 being drawn down and into fixed abutment against upper beveled surface 20 of lens support 1, such as fixedly and abuttingly against abutment line 86. In accordance with some further embodiments, the formation of negative pressure within central lens support chamber 98 also results in lower surface 29 of lens support 1 and upper surface 95 of base 92 being in fixed abutment with each other.

With outer edge 74 of forward surface 65 of lens 3 and upper beveled surface 20 of lens support 1 being held in fixed abutment against each other by the presence of negative pressure within central lens support chamber 98, one or more coating compositions can be applied over rear surface 68 of lens 3, without the position of lens 3 shifting (or changing) relative to upper beveled surface 20. In addition, with lower surface 29 of lens support and upper surface 95 of base 92 being in fixed abutment with each other, by the presence of negative pressure within central lens support chamber 98, one or more coating compositions can be applied over rear surface 68 of lens 3, without the position of lens support 1 shifting (or changing) relative to base 92.

In accordance with some further embodiments, the method of the present invention involves: (i) contacting together a contact portion of the forward surface of the lens and a suction device; and (ii) forming negative pressure between the contact portion of the forward surface of the lens and the suction device, thereby maintaining the outer edge of the forward surface of the lens and the upper beveled surface of the lens support in fixed abutment with each other during application of at least one coating composition over the rear surface of the lens.

Figure 6:
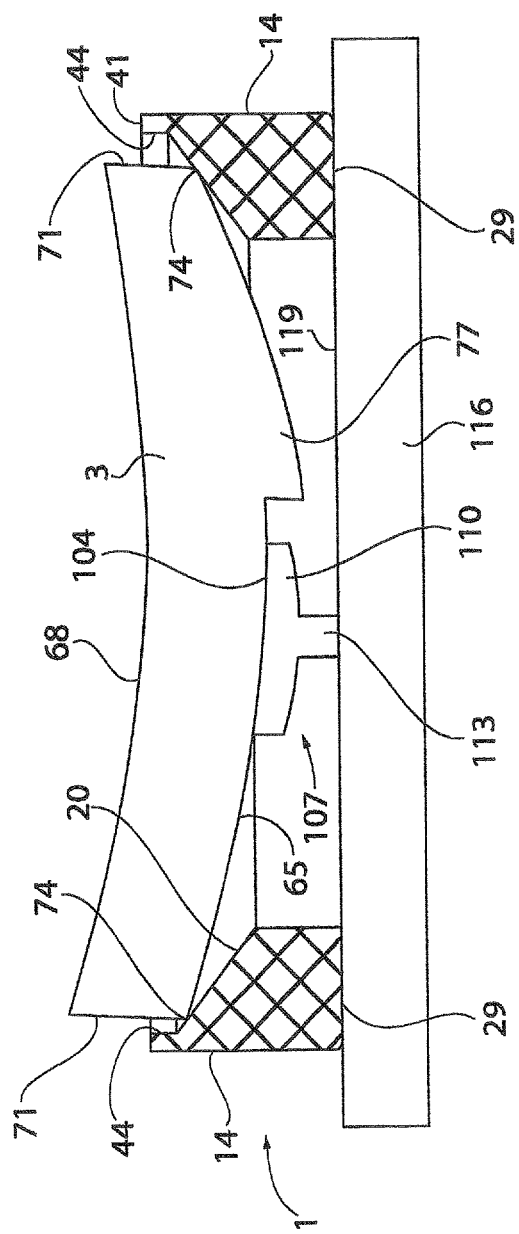
FIG. 6 is a representative sectional view of the lens of FIG. 4 positioned supportively on the lens support of FIG. 1, which resides on a base, and which further includes a suction device in contact with the forward surface of the lens.

With reference to FIG. 6, contact portion 104 of forward surface 65 of lens 3 and a suction device 107 are contacted together. Negative pressure is formed between contact portion 104 of forward surface 65 of lens 3 and suction device 107. With some embodiments, suction device 107 includes a suction cup 110 that is contacted with contact portion 104 of forward surface 65 of lens 3. Negative pressure can be formed between suction cup 110 and contact portion 104 of forward surface 65 of lens 3 by drawing gas, such as air, out from there-between, such as through a channel (not shown) extending longitudinally through pedestal 113. Alternatively, negative pressure can be formed between suction cup 110 and contact portion 104 of forward surface 65 of lens 3 by forcing gas, such as air, out from there-between by pressing together suction cup 110 (fabricated from a flexible material, such as an elastomeric polymer) and contact portion 104 of forward surface 65 of lens 3, in accordance with art-recognized procedures. With negative pressure formed between suction cup 110 of suction device 107 and contact portion 104 of forward surface 65 of lens 3, outer edge 74 of forward surface 65 of lens 3 and upper beveled surface 20 of lens support 1 are maintained in fixed abutment with each other during application of at least one coating composition over rear surface 68 of lens 3.

The suction device, with some embodiments, is attached to a base, and the lower surface of the lens support resides on the base. With further reference to FIG. 6, and with some embodiments, suction device 107 is attached to base 116, and lower surface 29 of lens support 1 resides on base 116. With some further embodiments, suction device 107 further includes a pedestal 113 that extends from upper surface 119 of base 116 to suction cup 110. Pedestal 113 is, with some embodiments, fabricated from a rigid material, a flexible material, or a combination thereof. In accordance with some further embodiments, pedestal 113 is reversibly and a least partially retractable down within base 116, which results in suction cup 110 and forward surface 65 of lens 3 being drawn down toward upper surface 119 of base 116, and correspondingly outer edge 74 of forward surface 65 of lens 3 and upper beveled surface 20 of lens support 1 being drawn into fixed abutment with each other.

As described previously herein and with some embodiments, the lens support further includes an annular lip 41, having an inner lip wall 44, that extends upward from upper beveled surface 20 of the lens support. In accordance with some further embodiments, the lens and the lens support are positioned relative to each other such that the side surface of the lens and the inner lip wall of the annular lip are spaced from each other. With reference to FIGS. 5 and 6, lens support 1 and lens 3 are positioned as described previously herein such that outer edge 74 of forward surface 65 of lens 3 abuts a portion, such as abutment line 86 (FIGS. 1 and 2), of upper beveled surface 20 of lens support 1. With lens 3 so positioned on upper beveled surface 20, side surface 71 of lens 3 and inner lip wall 44 of annular lip 41 are spaced from each other and are free of abutment or contact therebetween, with some embodiments of the method of the present invention.

With the side surface of the lens and the inner lip wall of the annular lip of the lens support spaced from each as described above, the side surface of the lens has a height, the inner lip wall of the annular lip has a height, and the height of the side surface of the lens is greater than the height of the inner lip wall of the annular lip. With reference to FIG. 5, side surface 71 of lens 3 has a height 122 that is greater than the height 53 of inner lip wall 44 annular lip 41, with some embodiments.

With some further embodiments, the side surface of the lens extends above the annular lip of the lens support, when the lens and upper beveled surface of the lens support are positioned in abutting relationship as describe previously herein. With reference to FIG. 5, the upper extent 125 of side surface 71 of lens 3 extends above annular lip 41 of lens support 1, when lens support 1 and lens 3 are positioned as described previously herein such that outer edge 74 of forward surface 65 of lens 3 abuts a portion, such as abutment line 86 (FIGS. 1 and 2), of upper beveled surface 20 of lens support 1. With further reference to FIG. 5 and with some further embodiments, the upper extent 125 of side surface 71 of lens 3 is level with or resides below (not depicted) annular lip 41 of lens support 1, when lens support 1 and lens 3 are positioned as described previously herein such that outer edge 74 of forward surface 65 of lens 3 abuts a portion, such as abutment line 86 (FIGS. 1 and 2), of upper beveled surface 20 of lens support 1.

The present invention also relates to a lens support as described previously herein, such as, but not limited to lens support 1 of FIGS. 1-3, 5 and 6. In accordance with some embodiments, and with reference to FIG. 3, the upper beveled surface 20 of the lens support 1 has an angle 38, relative to horizontal, that is selected such that an outer edge 74 of a forward surface 65 of a lens 3 abutting a portion of the upper beveled surface 20 of the lens support 1 is abuttingly retained on the upper beveled surface 20. In accordance with some embodiments, the upper beveled surface of the lens support has an angle 38 (or downward angle 38), relative to horizontal (or an overlying horizontal), of from 10° to 50°, or from 15° to 45°, or from 20° to 40°.

With some further embodiments, the lens support includes an annular lip, which is dimensioned such that a side surface of the lens and the inner lip wall of the annular lip are spaced from each other. As described previously herein with reference to FIG. 3, annular lip 41 has: (i) a height 53, that extends, with some embodiments, above an upper terminus 56 (FIG. 5) of upper beveled surface 20; and a width 59. The dimensions of annular lip 41, such as, but not limited to the height 53 and width 59 thereof are selected such that side surface 71 of lens 3 and inner lip wall 44 of annular lip 41 are spaced from each other, when lens 3 and lens support 1 are positioned in abutment with each other, as described previously herein. See, for example, FIGS. 5 and 6.

The present invention has been described with reference to specific details of particular embodiments thereof. It is not intended that such details be regarded as limitations upon the scope of the invention except insofar as to the extent that they are included in the accompanying claims.

What is claimed is:

1. A method of coating a lens comprising:
   (a) providing a lens support comprising,
      a central axis,
      an outer wall,
      an inner wall that is positioned between said central axis and said outer wall,
      an upper beveled surface that converges downward towards said central axis, said upper beveled surface having an outer diameter and an inner diameter, and
      a lower surface,
   wherein said lens support has a form of a ring, and said inner wall defines a central lens support hole;
   (b) providing a lens having a forward surface, a rear surface, and a side surface, wherein said forward surface of said lens has an outer edge;
   (c) positioning said lens support and said lens such that said outer edge of said forward surface of said lens abuts a portion of said upper beveled surface of said lens support; and
   (d) applying at least one coating composition over said rear surface of said lens, thereby forming at least one coating layer over said rear surface of said lens
   wherein said lower surface of said lens support resides on a base, said forward surface of said lens, said inner sidewall of said lens support, and an upper surface of said base together defining a central lens support chamber, said method further comprising,
      forming negative pressure within said central lens support chamber, thereby maintaining said outer edge of said forward surface of said lens and said upper beveled surface of said lens support in fixed abutment with each other during application of at least one coating composition over said rear surface of said lens.

2. The method of claim 1, wherein said outer edge of said forward surface of said lens defines an abutment line on said upper beveled surface of said lens support, said abutment line being positioned between said inner diameter and said outer diameter of said upper beveled surface.

3. The method of claim 1, wherein said forward surface of said lens is a convex surface.

4. The method of claim 3, wherein said forward surface of said lens comprises a segmented optical power addition portion.

5. The method of claim 3, wherein said rear surface of said lens is a concave surface or a flat surface.

6. The method of claim 1, wherein said upper beveled surface of said lens support has an angle, relative to horizontal, of from 10° to 50°.

7. The method of claim 1, wherein said lens support further comprises an annular lip extending upward from said upper beveled surface of said lens support, said annular lip having an inner lip wall.

8. The method of claim 7, wherein said side surface of said lens and said inner lip wall of said annular lip are spaced from each other.

9. The method of claim 7, wherein said side surface of said lens has a height, said inner lip wall of said annular lip has a height, and said height of said side surface of said lens is greater than said height of said inner lip wall of said annular lip.

10. The method of claim 7, wherein said annular lip has an inner diameter, and said inner diameter of said annular lip and said outer diameter of said upper beveled surface of said lens support are substantially equivalent.

11. The method of claim 1, wherein applying each coating composition over said rear surface of said lens independently comprises an application method selected from the group consisting of spray application, spin application, curtain application, blade application, and combinations of two or more thereof.

12. The method of claim 1, wherein each coating composition is independently selected from the group consisting of a photochromic coating composition, a primer coating composition, a protective coating composition, and an anti-reflective coating composition.

13. A lens support comprising,
a central axis,
an outer wall,
an inner wall that is positioned between said central axis and said outer wall,
an upper beveled surface that converges downward towards said central axis, said upper beveled surface having an outer diameter and an inner diameter, and
a lower surface,
wherein said lens support has a form of a ring, and said inner wall defines a central lens support hole,
wherein said upper beveled surface of said lens support has an angle, relative to horizontal, that is selected such that an outer edge of a forward surface of a lens abutting a portion of said upper beveled surface of said lens support is abuttingly retained on said upper beveled surface,
wherein said lower surface of said lens support resides on a base, said forward surface of said lens, said inner sidewall of said lens support, and an upper surface of said base together defining a central lens support chamber, and
wherein negative pressure formed within said central lens support chamber, maintains said outer edge of said forward surface of said lens and said upper beveled surface of said lens support in fixed abutment with each other.

14. The lens support of claim 13, wherein said outer edge of said forward surface of said lens defines an abutment line on said upper beveled surface of said lens support, and said abutment line is positioned between said inner diameter and said outer diameter of said upper beveled surface.

15. The lens support of claim 13, wherein said lens support further comprises an annular lip extending upward from said upper beveled surface, said annular lip having an inner lip wall.

16. The lens support of claim 15, wherein said annular lip has an inner diameter, and said inner diameter of said annular lip and said outer diameter of said upper beveled surface of said lens support are substantially equivalent.

17. The lens support of claim 15, wherein said annular lip is dimensioned such that a side surface of said lens and said inner lip wall of said annular lip are spaced from each other.

18. The lens support of claim 13, wherein said angle of said upper beveled surface is from 10° to 50°.

* * * * *

UNITED STATES PATENT AND TRADEMARK OFFICE
CERTIFICATE OF CORRECTION

PATENT NO. : 10,688,522 B2
APPLICATION NO. : 15/037088
DATED : June 23, 2020
INVENTOR(S) : Paul J. Lynch et al.

Page 1 of 1

It is certified that error appears in the above-identified patent and that said Letters Patent is hereby corrected as shown below:

In the Claims

Column 22, Line 58, Claim 1, delete "lens" and insert -- lens, --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*